No. 610,104. Patented Aug. 30, 1898.
W. TAYLOR.
BICYCLE BRAKE.
(Application filed July 7, 1897.)
(No Model.)
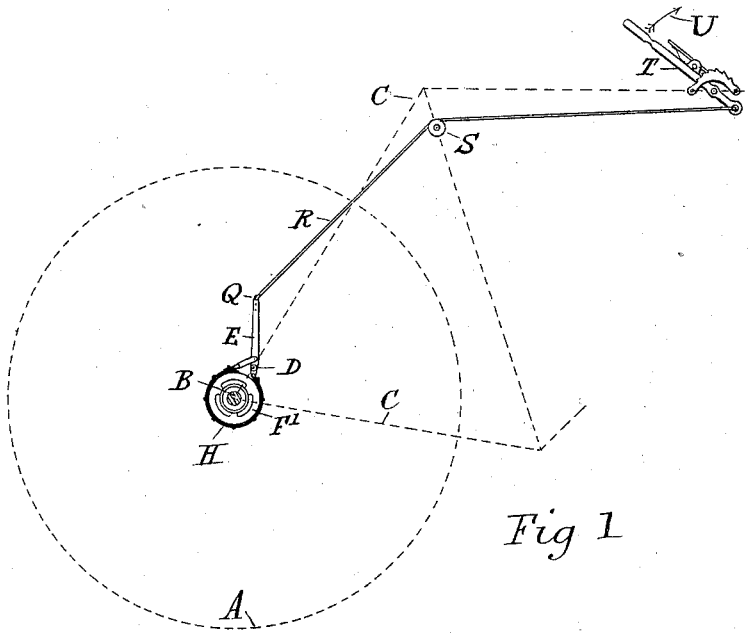
Fig 1
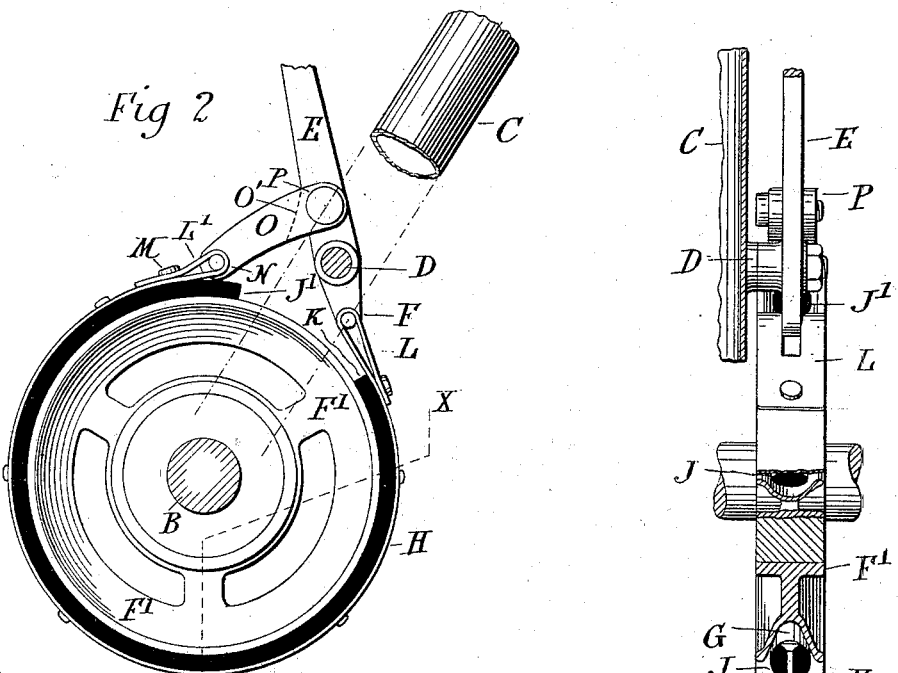
Fig 2
Fig 3
Witnesses
D. H. Blakelock
J. Stephen Ginsta
Inventor
William Taylor
By Wilkinson & Fisher
Attorneys

UNITED STATES PATENT OFFICE.

WILLIAM TAYLOR, OF BALLARAT, VICTORIA.

BICYCLE-BRAKE.

SPECIFICATION forming part of Letters Patent No. 610,104, dated August 30, 1898.

Application filed July 7, 1897. Serial No. 643,767. (No model.) Patented in England March 15, 1897, No. 6,780.

*To all whom it may concern:*

Be it known that I, WILLIAM TAYLOR, miller, a subject of the Queen of the United Kingdom of Great Britain and Ireland, residing at Ballarat, in the county of Grant, Colony of Victoria, Australia, have invented certain new and useful Improvements in Wheel-Brakes for Bicycles, (for which Letters Patent of Great Britain, No. 6,780, dated March 15, 1897, have been granted to William Humphrey Wheatley, of London, England, as a communication from abroad from myself;) and I do hereby declare that the following is a full, clear, and exact description of the invention, which will enable others skilled in the art to which it appertains to make and use the same.

The object of my invention is to supply a wheel-brake adapted for use in bicycles and the like and by which great power and speed of action are obtainable without injury to the bicycle or the like or disadvantage to a rider on said bicycle or the like.

On referring to the drawings attached illustrations of my invention will be seen.

Figure 1 is a diagram showing a side elevation of part of a bicycle containing the said brake with the brake in closed position or "on." Fig. 2 is a side elevation of parts of Fig. 1, but upon a larger scale and with the brake in open position or "off." Fig. 3 shows an end elevation of the parts in Fig. 2 in section on the line X Y, looking to the left.

A shows the rear wheel of a bicycle; B, its axle; C, its frame; D, a stud or pin on the frame, said stud forming a horizontal bearing or fulcrum, on which is pivoted a brake-lever E. Near one end F of said lever E is a wheel or hub F', attached rigidly to the axle B and having a V-shaped groove G at its circumference. The wheel F' is carried on the axle (in the case of a bicycle of the usual safety construction) on the opposite side to that occupied by the chain sprocket-wheel.

H is a steel spring-strap, having united to it a lining J, of leather or other suitable material and of curved section, on the side nearest groove G, the tendency of the spring being such that when the brake is off the strap will take a circular position around, not touching, but at a slight distance from the hub F'. One end K of the band-brake is attached pivotally, as by a loop L, in the end of the steel spring-strap H to the end F of the lever E, and at a point M, near but not at the other end J' of the band, is connected by a loop L' in the corresponding end of the spring-strap H pivotally to a pin N, passing through the end of the link O, the opposite end of the said link being bifurcated, as seen most clearly in Fig. 3, and pivoted, as at P, upon the lever E at a point on the opposite side of the fulcrum D from the side on which the end K is pivoted.

The dotted line at O' in Fig. 2 indicates the rear of the bifurcation, from which it will be seen that this rear wall allows ample room for the lever to swing forward in putting the brake "on;" but it will also be seen that the lever E will come into contact with the upper edge of this inclined wall O' when the lever is released for putting the brake "off," and that the end of the link which is pivoted to the strap H will be held from swinging outward, due to the action of the spring-strap H, as it otherwise would. The effect of this bifurcated link having its bifurcated end provided with this stop is to cause the band to ease off of the periphery of the brake-wheel from both ends equally and maintaining its circular form.

Any means may be employed of connecting with a handle for operating the same that end Q of lever E which is remote from the hub F'; but what I prefer is a steel wire R, running (over a pulley S on the frame to keep the wire close to the lines of the frame C) to the end of a hand-lever T, pivoted to the upper backbone of the bicycle and having an ordinary ratchet or spring-catch arrangement of such construction as to retain the hand-lever, and consequently the brake, in any position to which it is moved.

When the hand-lever T is as in Fig. 1, the brake is hard "on"—that is, the part J of the strap is pressing hard into the groove G and the ends K and J' are close together. When the handle of T is moved in the direction shown by arrow U, it allows the lever E to assume the position in Fig. 2, wherein the ends K and J' have receded from one another, both ends moving at the same time. In this invention the taking off or pulling on of the brake proceeds from a movement at both the said ends, insuring rapidity, and much of the unequal action on the hub as the brake is applied or removed, which arises from some ordinary spring-band brakes, is avoided by reason of the two ends of the band being held near to the rim of the wheel while being released and applied.

Having now described this invention, I claim—

In a band-brake for vehicles, the combination with a brake-wheel having a grooved periphery, and a lever-arm pivoted near one end upon the frame of the vehicle in juxtaposition to said brake-wheel; of a yielding band slightly shorter than the periphery of said brake-wheel, adapted to engage the groove therein; a flat metallic spring secured upon said yielding band, pivotally connected at one end to the short end of said lever; a link pivotally connected at one end to the other end of said spring near the corresponding end of the said yielding band; the said link having its other end bifurcated and pivoted upon said lever upon the opposite side of its fulcrum from the point of pivotal connection of the first-named end of the spring; and a stop at one side of said bifurcation to arrest the backward movement of the lever with respect to said link when the brake is released, substantially as described.

In witness whereof I have hereunto set my hand in presence of two witnesses.

WILLIAM TAYLOR.

Witnesses:
G. G. TURRI,
W. H. CUBLEY.